W. E. MYER.
ACCOUNT KEEPING DEVICE.
APPLICATION FILED JULY 21, 1909.

1,013,047.

Patented Dec. 26, 1911.
4 SHEETS—SHEET 1.

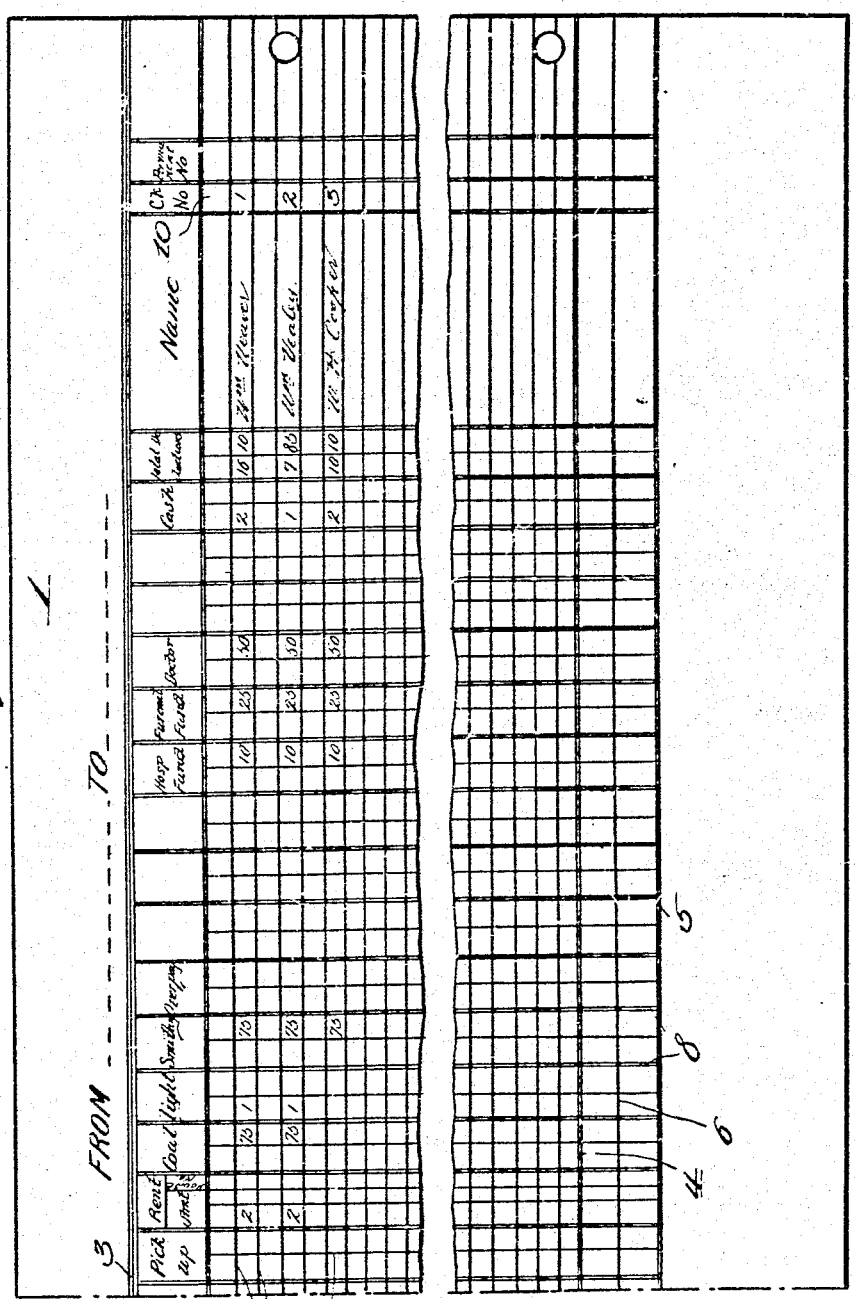

W. E. MYER.
ACCOUNT KEEPING DEVICE.
APPLICATION FILED JULY 21, 1909.

1,013,047.

Patented Dec. 26, 1911.
4 SHEETS—SHEET 3.

Witnesses:
C. J. Kesler
Robert Evaitt

Inventor
William E. Myer
By James L. Norris

W. E. MYER.
ACCOUNT KEEPING DEVICE.
APPLICATION FILED JULY 21, 1909.

1,013,047.

Patented Dec. 26, 1911.
4 SHEETS—SHEET 4.

UNITED STATES PATENT OFFICE.

WILLIAM E. MYER, OF WINIFREDE, WEST VIRGINIA.

ACCOUNT-KEEPING DEVICE.

1,013,047.
Specification of Letters Patent.
Patented Dec. 26, 1911.

Application filed July 21, 1909. Serial No. 508,824.

*To all whom it may concern:*

Be it known that I, WILLIAM E. MYER, a citizen of the United States, residing at Winifrede, in the county of Kanawha and State of West Virginia, have invented new and useful Improvements in Account-Keeping Devices, of which the following is a specification.

My present invention relates to improvements in devices adapted for use in the keeping of accounts, and it has for its object primarily to provide a simple and improved pay-roll form which is adapted to receive entries of the various debits and credits for each person or employee, such entries being so made with reference to the rulings of the form as to enable the bookkeeper to ascertain the amount due any given employee directly and by a mere inspection of the form, the ruling and the heading of the form being such that it may be used either as a monthly or a semi-monthly pay-roll.

To these and other ends, the invention consists in certain improvements, and combinations and arrangements of parts, all as will be hereinafter more fully described, the novel features being pointed out particularly in the claims at the end of the specification.

In the accompanying drawing: Figures 1 and 1ª illustrate the two halves of the debit side of a pay-roll form constructed in accordance with the present invention; and Figs. 2 and 2ª are views similar to Figs. 1 and 1ª showing the credit side of a pay-roll form.

Similar parts are designated by the same reference characters in the several views.

The present invention is applicable generally to the keeping of accounts, and while it is especially adapted for use in the keeping of a pay-roll and it is so shown in the accompanying drawing, it will be understood that the invention is not limited to such use, as appropriate changes or alterations therein may adapt it to other uses according to the circumstances of each particular case. I have shown the form as a pay-roll but it will be understood that I have so shown it merely to illustrate one way of using it, it being understood that the entries may vary according to the nature of the accounts that are to be kept or the entries themselves that are to be made in the form.

For convenience, it is preferable to make debit side of the form as a page or sheet and the credit side as a separate page or sheet, and in practice, these pages may be bound together either temporarily or otherwise and usually the debit side of one form will be opposite to the credit side of the same form when the book is opened.

In the present instance, I have shown the form as embodying a debit sheet 1 and a credit sheet 2. Each sheet is ruled with horizontally and vertically arranged line forming horizontal columns to receive all data that is to be entered as a debit or credit with reference to each account or employee, and the vertical lines form vertical columns which have appropriate headings to indicate at what points on the horizontal columns the various entries are to be made.

Describing first the debit sheet, the top of this sheet is preferably provided with a space to receive such data as the name of the company keeping the accounts and the time or interval included by the data entered on such sheet. Extending horizontally across the upper portion of this sheet are a pair of division lines 3 forming a horizontal column to contain headings, and across the lower portion of the sheet extend upper and lower lines 4 and 5 and an intermediate line 6 which form horizontal columns, the upper one to receive entries of the totals for this particular pay-roll sheet while the lower column is to receive the grand totals, appropriate designations being preferably made at the left hand ends of these two horizontal columns. Between the heading column and the total columns, the sheet is divided by a suitable number of horizontal lines 7 and also by a series of suitably spaced vertical lines 8, the latter being preferably double-ruled and extending into the heading and total columns. The spaces between the double-ruled vertical lines 8 are subdivided by subdividing lines 9. In the present instance the forms are adapted for use in connection with coal and coke industries and the headings across the page or sheet are selected accordingly. For instance, at the extreme left hand edge of the sheet, a vertical column is provided for the check numbers, a second column 10 may also be provided toward the opposite end of the sheet to receive the check numbers whereby data may be entered correctly and quickly in the appropriate horizontal column and correct readings may also be readily made. Next to the column 10 may be provided a column to receive the names of the employees, and immediately to the left of the column containing the names may be arranged a column to receive the total amount in dollars and cents of all the entries made in the respective horizontal columns as debits against the various names. In the column for the headings on the debit sheet 1 is placed a heading representing the days of the month in which charges, represented by suitable numerals are to be made against each name or employee for such supplies for instance as merchandise. According to the present invention this heading is arranged in a novel manner whereby each page or sheet may be used over a period of either a month or half a month. This heading is therefore divided into a series of three rows of numerals, the upper row 11 running for instance from one to fifteen and representing the first half of the month, the second or intermediate row 12 containing numerals reading from one to thirty consecutively and representing such months as contain thirty days, and the third or lowermost row 13 containing numerals reading from sixteen to thirty and representing the second half of such months as contain thirty days, a separate space 14 being arranged at the right hand ends of the three rows of numerals just described and containing the numeral 31, the vertical column having this last named heading being used only in such months as contain thirty-one days.

The page or sheet 2 that contains the credit side of the form is similar in general to the debit side in ruling, although the headings for the various vertical columns are appropriate to the entries that are to be made therein, this section of the form being of course adapted to receive all entries of credits that are to be made in favor of each account or employee. The right hand end of this credit page is preferably provided with a vertical column 15 which may receive the signatures of the various employees, these signatures being made in alinement with the horizontal rows containing all entries pertaining to the credit side of the account for the respective employees and such signatures will serve as the receipt for the amount paid. To the left of this signature-receiving column may be arranged a column 16 to receive the check numbers corresponding to the various employees, and adjacent to this latter column may be arranged the columns to receive the amount, in dollars and cents due each employee. The credit side of the form, like the debit side, is also preferably provided with a heading which enables this side of the form to be used either as covering a monthly or a semi-monthly period, the spaces in vertical alinement with the respective numerals of the heading being adapted to receive entries or credits, such as numerals indicating the number of tons of coal mined by the employees on such dates.

Both sections of the form may be used so as to cover a monthly period by apportioning a single space between the horizontal lines 7 to each employee, and using the intermediate row of numerals 12 which covers the period of a month. By apportioning two of the horizontal spaces, however, to each employee, each section of the form may be adapted for use as a semi-monthly pay-roll or account. In the latter instance, all entries for the first half of the month would be made in a square space 17 at the upper left hand corner of the area apportioned to each employee, while the entries for the second half of the month would be made in the square space 18 at the lower right hand corner of the area apportioned to each employee. By providing two horizontal spaces for the entries for each employee, all entries for the first half of a month, the dates of which are represented by the row of numerals 11, may be entered in one horizontal row of spaces and the totals may be entered in alinement therewith, while the entries for the second half of the month and following the row of numerals 13, may be made in a horizontal row of spaces immediately adjacent to the previous row of entries for the same employee and the total for the latter half of the month may be entered in the appropriate column. In this way all entries and their respective totals for the first and second halves of a month may be kept separate.

In the accompanying drawing, I have shown the upper section of each form as partially filled with entries in such cases where the form is used as a semi-monthly pay-roll, while in the lower portion of Fig. 1 I have shown the entries so made as to render the form applicable for use as a monthly pay-roll. It is obvious that the form may be used either as a monthly or a semi-monthly pay-roll without changing the rulings or headings in any respect, although to avoid confusion, when the pay-roll is to be used as a monthly one, lines may be drawn through the numerals in the columns 11 and 13, and vice versa.

I claim as my invention:

1. A pay-roll form comprising a sheet provided with a plurality of vertically extending columns grouped in pairs, a heading on the sheet embodying two horizontally extending rows of numerals, the numerals of one row corresponding to the days comprising the first half of a month and being located in alinement with the respective pairs of said vertical columns, and the numerals of the second row corresponding to the days comprising the second half of a month and being also located in alinement with said pairs of vertical columns of the sheet, and a plurality of horizontal lines on the sheet intersecting the vertical columns, certain of said horizontal lines each having a properly designated name-receiving space between them and also a properly designated space between them to receive a total entry in alinement therewith, the intersection of said horizontal lines and the vertical columns forming spaces in alinement with one of said rows of numerals to receive entries for one-half of a month, and the intersection of the remainder of said horizontal lines and vertical columns forming spaces in alinement with the other row of numerals to receive entries for the other half of a month and having said properly designated space in alinement therewith to receive a total entry.

2. A pay-roll form comprising a sheet provided with a plurality of vertically extending columns grouped in pairs, a heading on the sheet embodying three horizontally extending rows of numerals, the numerals of two rows corresponding respectively to the days comprising the first and second halves of a month and each numeral of said rows embracing one of said pairs of the vertical columns, and the third row of numerals representing consecutively the days comprising an entire month, each numeral of the third row being individual to one of the vertically extending columns, and a plurality of horizontal lines on the sheet intersecting the vertical columns to form subdivisions thereof, certain of said horizontal lines each having between them a properly designated name-receiving space and also a properly designated space to receive a total entry in alinement therewith, the subdivisions of the vertical columns being in alinement with one of said rows of numerals to receive entries for all the days of a month, certain of said subdivisions also being in alinement with said row of numerals for the first half of a month, and the remainder of said subdivisions being in alinement with said row of numerals for the second half of a month to receive entries for the other half of a month and having said total entry-receiving space in alinement therewith.

In testimony whereof I have hereunto set my hand in presence of two subscribing witnesses.

WILLIAM E. MYER.

Witnesses:
CHARLES H. MOORE,
W. B. GROVES.

---

Copies of this patent may be obtained for five cents each, by addressing the "Commissioner of Patents, Washington, D. C."